United States Patent
Huang et al.

(10) Patent No.: US 7,023,618 B2
(45) Date of Patent: Apr. 4, 2006

(54) DUAL-STAGE OPTICAL ISOLATOR MINIMIZED POLARIZATION MODE DISPERSION AND SIMPLIFIED FABRICATION PROCESS

(75) Inventors: Yonglin Huang, Milpitas, CA (US); Liren Du, Sunnyvale, CA (US); Meng Ma, San Jose, CA (US); Shuyun Huang, Santa Clara, CA (US)

(73) Assignee: Finisar Corporation, Sunnyvale, CA (US)

( * ) Notice: Subject to any disclaimer, the term of this patent is extended or adjusted under 35 U.S.C. 154(b) by 107 days.

(21) Appl. No.: 09/900,092

(22) Filed: Jul. 5, 2001

(65) Prior Publication Data

US 2002/0071182 A1    Jun. 13, 2002

Related U.S. Application Data

(60) Provisional application No. 60/255,687, filed on Dec. 12, 2000.

(51) Int. Cl.
*G02B 27/28* (2006.01)
*G02B 5/30* (2006.01)
(52) U.S. Cl. ............ 359/484; 359/494; 359/496; 359/497; 372/703; 385/11
(58) Field of Classification Search .......... 359/484, 359/494–497, 500; 385/11; 372/703
See application file for complete search history.

(56) References Cited

U.S. PATENT DOCUMENTS

| 5,446,578 A | * | 8/1995 | Chang et al. ............ 359/282 |
| 5,566,259 A | * | 10/1996 | Pan et al. .................. 385/11 |
| 2002/0135882 A1 | * | 9/2002 | Xie ............................ 359/618 |

FOREIGN PATENT DOCUMENTS

| EP | 0653660 A1 | * | 11/1994 |
| EP | 0653661 A1 | * | 11/1994 |
| JP | 11-174382 | * | 7/1999 |
| JP | 11174382 A | * | 7/1999 |

* cited by examiner

*Primary Examiner*—Leonidas Boutsikaris
(74) *Attorney, Agent, or Firm*—Workman Nydegger

(57) ABSTRACT

An optical isolator includes a first stage configured to refract a light ray applied in a forward direction into a first ray and a second ray. A second stage rotated 90° with respect to the first is configured to refract said first and second rays in a substantially parallel manner. The isolator is configured such that the first ray comprises an e-ray with respect to the first stage and an o-ray with respect to the second stage, and the second ray comprises an o-ray with respect to the first stage and an e-ray with respect to the second stage, thereby substantially reducing the effects of polarization mode dispersion.

15 Claims, 4 Drawing Sheets

DUAL-STAGE OPTICAL ISOLATOR MINIMIZED POLARIZATION MODE DISPERSION AND SIMPLIFIED FABRICATION PROCESS

RELATED APPLICATIONS

This application claims the of US Provisional Application Ser. No. 60/255,687, filed Dec. 12, 2000.

BACKGROUND

1. Field

The present invention relates generally to fiber optics. In particular, the present invention relates to optical isolators.

2. The Prior Art

BACKGROUND

The optical isolator is a key element of modern optical communication networks. Optical isolators allow light to travel in one direction, while blocking light traveling in an opposite direction. The ever-increasing speeds of today's optical networks have placed higher performance demands on optical isolators. Today, network speeds of 40 Gb/s and higher with long haul or ultra-long haul applications are required. Polarization Mode Dispersion (PMD) is a very important criteria which must be minimized in any high-speed, long haul optical communication system.

Dual-stage isolators are known in the art. As is known by those skilled in the art, dual-stage isolators offer the advantage of lower PMD. However, dual-stage isolators of the prior art suffer from the disadvantage of being difficult to manufacture and fabricate. This is because the crystals used to fabricate the dual-stage isolator are typically 22.5° wedges and therefore must be aligned at angles of 45° relative to each other. Precisely aligning optical crystals 45° with respect to each other can be a very difficult task that is time consuming and error prone.

SUMMARY

A dual-stage optical isolator is disclosed that includes a first stage of configured to refract a light ray applied in a forward direction into a first ray and a second ray. A second stage of is rotated 90° with respect to the first stage and configured to refract the first and second rays in a substantially parallel manner. The dual-stage optical isolator is configured such that the first ray is the e-ray with respect to the first stage and the o-ray with respect to the second stage. The second ray is the o-ray with respect to the first stage and the e-ray with respect to the second stage, thereby substantially reducing the effects of polarization mode dispersion.

BRIEF DESCRIPTION OF THE DRAWING FIGURES

DETAILED DESCRIPTION

Persons of ordinary skill in the art will realize that the following description is illustrative only and not in any way limiting. Other embodiments and modifications will readily suggest themselves to such skilled persons having the benefit of this disclosure.

Figure 1:
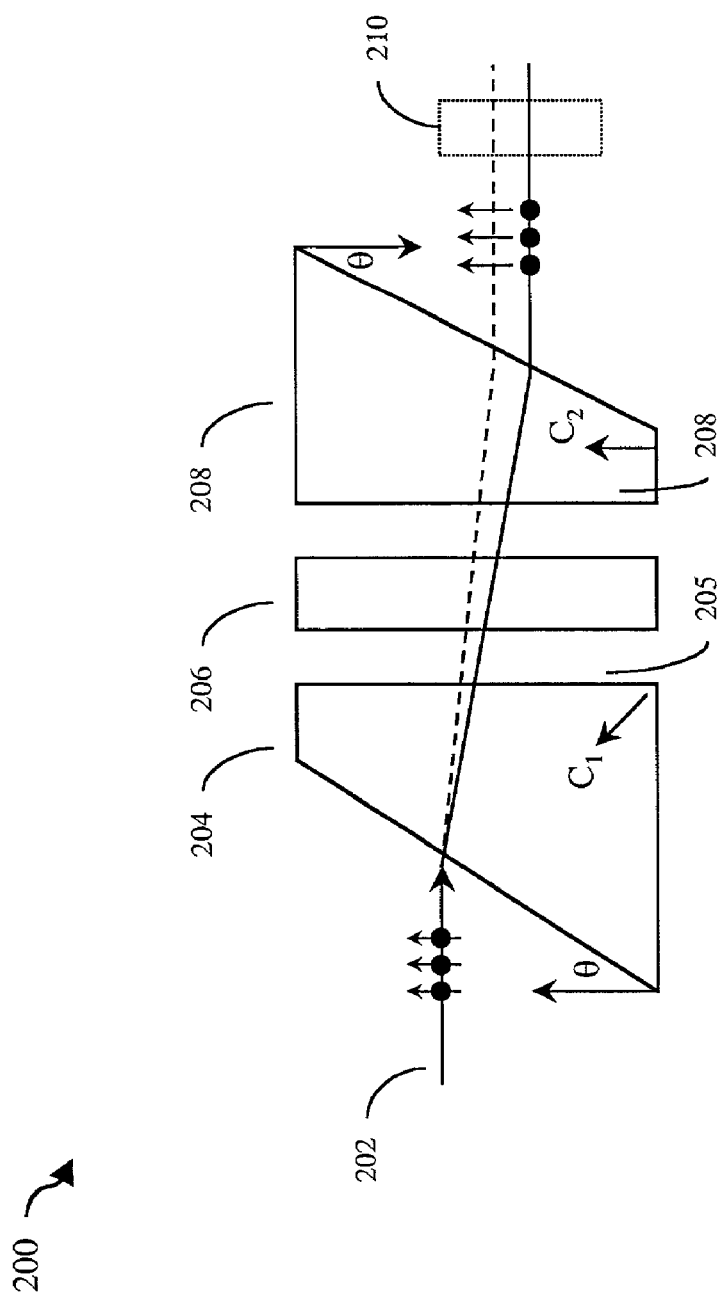
FIG. 1 is a side view of a stage of an optical isolator according to an embodiment of the invention.

FIG. 1 is a diagram of a first optical isolator stage 200 with incident light being applied along a path 202. Isolator stage 200 includes a first wedge 204 having a wedge angle $\theta$ and an optical axis angle $C_1$. First wedge 204 is preferably disposed within path 202 and has an optical axis angle $C_1$ measured with respect to edge 205 of the first wedge 202. First wedge 202 may comprise any birefringent material known in the art, such as $YVO_4$, $TiO_2$ and $LiNbO_3$.

First wedge 204 will separate the incident light into o-rays (shown as a solid line) and e-ray (shown as a dashed line) as is known in the art.

First isolator stage 200 also includes a polarization rotator 206 disposed within path 202 and configured to receive the o- and e-rays from the first wedge 204. The polarization rotator 206 may comprise any rotator known in the art for rotate the planes of polarization of the incident o- and e-rays at a predetermined angle, such as a garnet Faraday rotator. The rotator 206 may rotate the incident o- and e-rays at an angle of approximately 45°.

Isolator stage 200 further includes a second wedge 208 disposed within path 202 and configured to receive light from the rotator 206. The wedge angles $\theta$ of both wedges 204 and 208 may be substantially equal and formed from the same material.

The orientation of the angled surface of wedge 204 may be position to receive the incident beam 202, or may be positioned adjacent to the rotator 206, as desired. That is, the angled surfaces of the wedges 204 and 208 may be positioned adjacent the rotator 206 such that the angled surfaces maintained in parallel with respect to each other.

Second wedge 208 also has an optic axis $C_2$. The optic axes of the first and second wedges may 45° apart. Thus, the angle of $C_1$ added to the angle of the rotator will equal the angle of $C_2$. Second wedge 208 may be fabricated from any birefringent material as is known in the art. Preferred materials include $LiNbO_3$, $YVO_4$, and $TiO_2$. The wedges 204 and 208 are preferably formed from the same material.

Second wedge 208 is optically configured using methods known in the art such that when the o- and e-rays exit the wedge 208, they are refracted and aligned in a substantially parallel manner forming a plane 210. Plane 210 is optically formed by having the wedge cutting angles of first and second wedges 204 and 208 be substantially equal.

Additionally, in a preferred embodiment the e- and o-rays exit second wedge 208 substantially parallel to path 202 by virtue of the fact that the cutting angle of second wedge 208 is substantially equal to wedge 204.

If a negative birefringent material such as $LiNbO_3$ is used, the deflection angle for the o-ray will be greater than the deflection angle for the e-ray. Hence, the e-ray will exit the wedge 208 above the o-ray.

As can be seen by inspection of FIG. 1, the e- and o-rays exit the second wedge 208 having orthogonal planes of polarization and are separated by a walk-off distance d. In a preferred embodiment, the e-ray will have a plane of polarization parallel to plane 210, and the o-ray will have a plane of polarization normal to plane 210.

Figure 2:
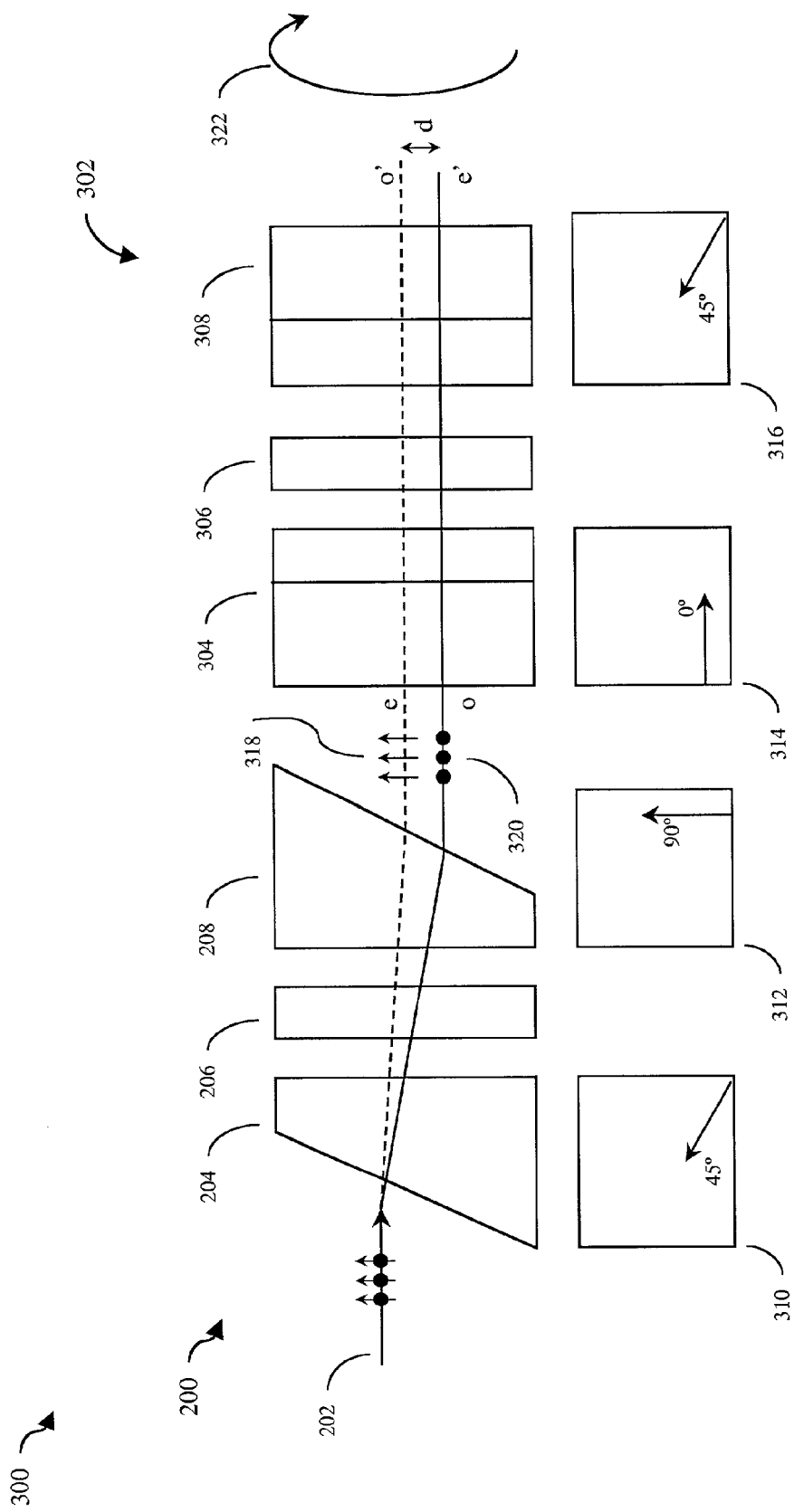
FIG. 2 is a functional diagram of an improved optical isolator core.

Referring now to FIG. 2, a side view of a dual-stage isolator core 300 is shown, including the first isolator stage 200 and a second isolator stage 302. First stage 200 comprises the first and second wedges 204 and 208, and the rotator 206, as previously shown and described. Second stage 302 includes a third wedge 304, and rotator 306, and a fourth wedge 308.

In a preferred embodiment, the third wedge 304 and the fourth wedge 308 have wedge angles substantially identical to their counterparts in the first stage 200. Furthermore, the optic axis angles of the third wedge 304 and the fourth wedge 308 may also be 45° apart from each other.

Figure 3:
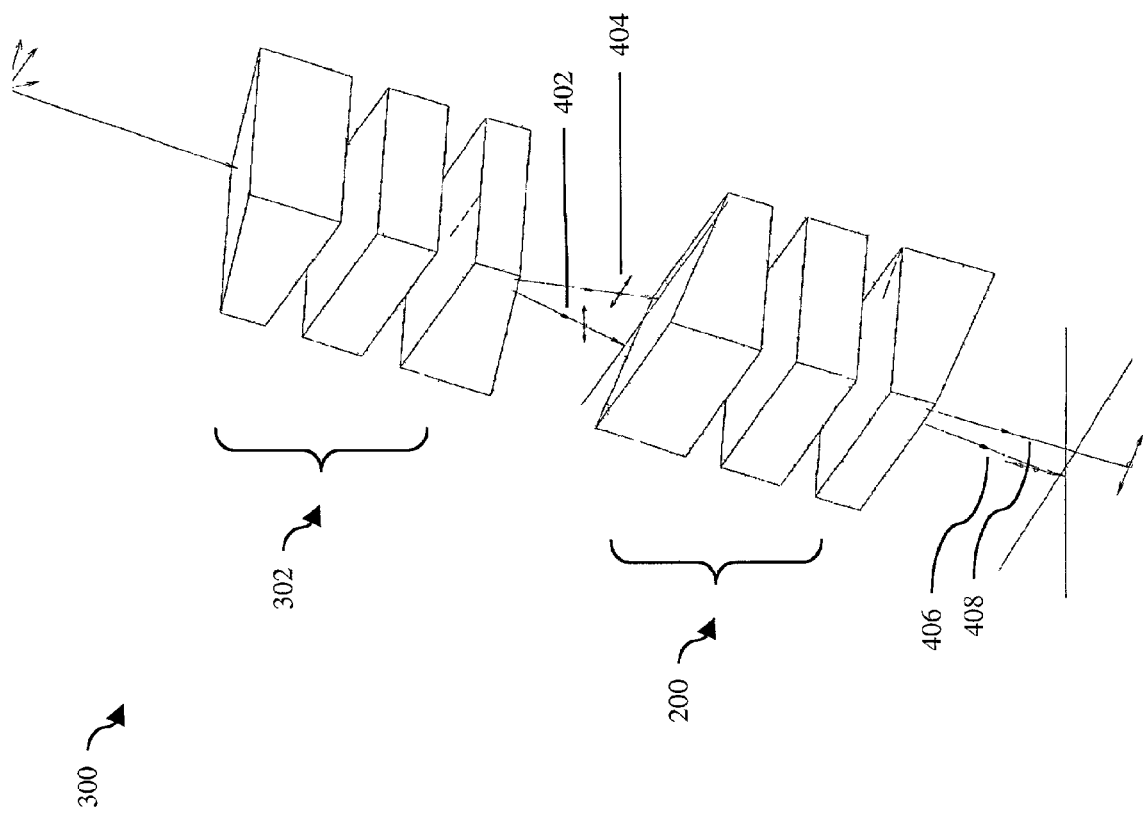
FIG. 3 is a perspective view of a dual stage isolator operating in the reverse path.

In a preferred embodiment, the second stage 302 is rotated about path 202 approximately 90° with respect to first isolator core 200 in mechanical orientation, as indicated by path 322. Thus, as seen in FIG. 3, we see the tops of the components of second stage after having been rotated 90°. It is contemplated that second stage may be rotated either +90° of −90° about path 202 with respect to the first stage 200.

FIG. 2 further includes diagrams of end surfaces 310, 312, 314, and 316 showing the optic axis cutting orientations of first wedge 204, second wedge 208, third wedge 304, and fourth wedge 308, respectively, after mechanical rotation. As can be seen by inspection of FIG. 2, the optic axis orientations of wedges 304 and 308 of the second stage 302 have been rotated 45° away from their counterpart wedges in first isolator core 200. Thus, after rotation, the optic axes of end surfaces 310 and 314 are 45° away from each other, and the optic axes of end surfaces of 312 and 316 are 45° away from each other. However, while the optic axis angles of the member wedges of two cores are both 45° away from each other, the two cores are not identical. The optic axis of the first wedge 204 may be 45° apart from the optic axis of the second wedge 208. Additionally, the optic axis of the second wedge 208 may be perpendicular to the third axis of the third wedge 304. Finally, the optic axis of the forth wedge may be 45° apart from that of the third wedge 304.

Referring now to the operation of the dual-stage isolator 300 of FIG. 2, incident light is applied along the path 202 to first isolator stage 200. Light is refracted as described above in FIG. 1, and exits as a first ray 318 and a second ray 320. Due to their relative polarizations, the first ray 318 is the e-ray with respect to the first stage 200, and the second ray 320 is the o-ray with respect to the first stage 200.

First and second rays 318 and 320 are then launched into the second isolator stage 302. However, because the second stage 302 is rotated 90° both mechanically and optically with respect to the first stage 200, the first ray 310 now represents the o-ray (shown as o') with respect to the second stage 302, and the second ray 320 represents the e-ray (shown as e') with respect to second isolator core 302. Furthermore, with wedge 304 now having an optic axis angle of 0° with respect to the path 202 and the applied first and second rays 318 and 320, the two rays will travel in substantially straight paths through the second stage 302, emerging from wedge 308 with orthogonal polarizations and separated by a walk-off distance d'.

However, by virtue of the fact that the first ray 318 is the e-ray in the first stage 200 and the o-ray in the second stage 302, and the second ray 320 is the o-ray in the first stage 200 and the e-ray in the second stage 302, any polarization mode dispersion caused by the first stage 200 is offset and compensated for by the second stage 302.

FIG. 3 is a perspective view of a dual-stage isolator 300 operating in the reverse path, right-to-left.

When ray 400 enters isolator core 302, it will be decomposed into two beams, ray 402 and ray 404. In contrast to the forward direction, the rays 402 and 404 will exit the second stage 302 at a horizontal divergent angle and after exiting the first stage 200, rays 402 and 404 will be imparted with an additional vertical divergent angle. Thus, the rays will exit as rays 406 and 408 traveling divergent paths. Since the rays travel different entry and exit paths, an optical isolator has been realized.

Figure 4:
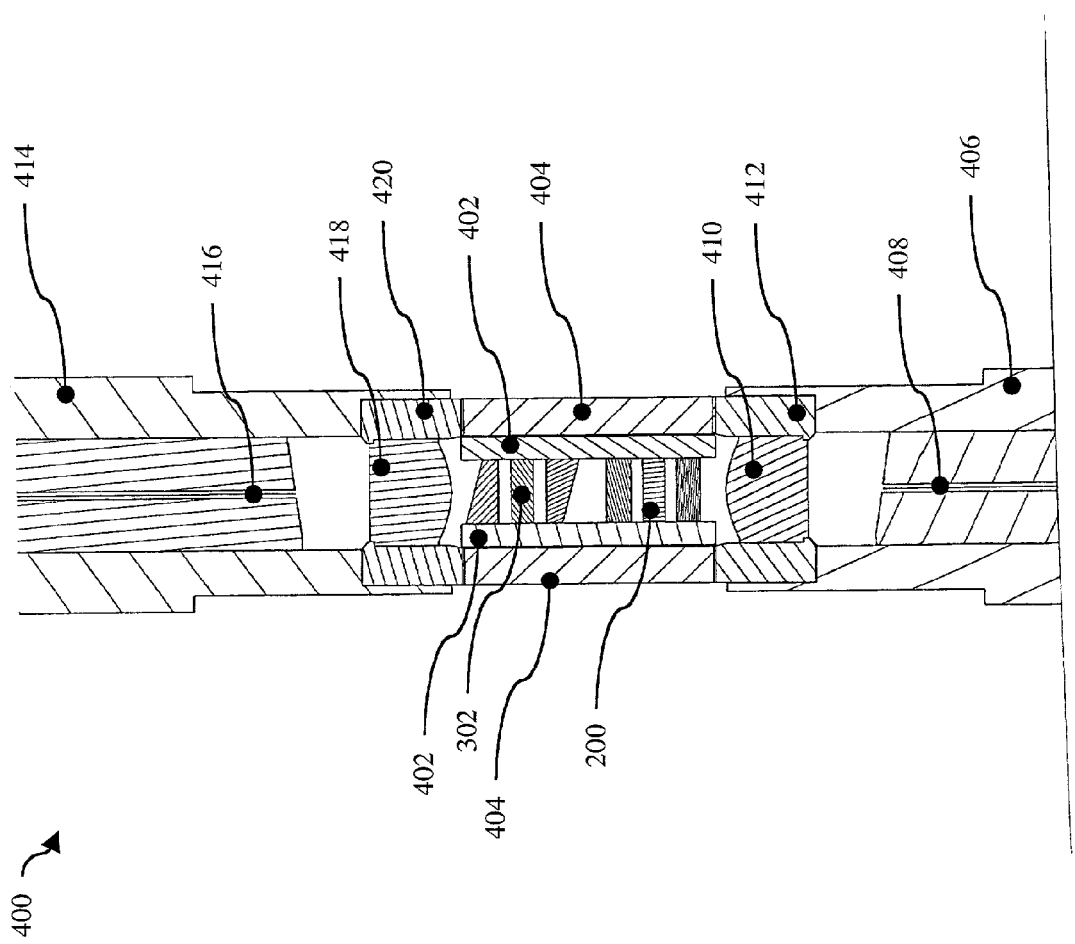
FIG. 4 is a schematic of a dual-stage isolator.

FIG. 4 is a diagram of a dual-stage isolator 400 configured as a finished unit. The dual-stage isolator 400 includes a first stage 200 and a second stage 302 as shown and described above, both disposed in a magnetic ring 402 for rotation and encased in a housing 404 for protection. Separate magnetic rings may be utilized for first stage 200 and second stage 302. The magnetic field direction of the separate magnetic rings may be chosen to control the rotation direction as desired.

The dual-stage isolator 400 may include a first collimator 406 having a fiber pigtail 408 and a coupling lens 410 encased within a ferrule 412, all of which may be formed from materials known in the art. The dual-stage isolator 400 may further include a second collimator 414 having a fiber pigtail pair 416 and a coupling lens 418 encased in a ferrule 420. It is contemplated that any optical fibers known in the art may be utilized with the disclosed optical isolator.

It is contemplated that the disclosed optical isolator and isolator core may be advantageously deployed in a variety of applications where low-loss elements are needed. For example, the disclosed isolator may be used in critical long-haul applications such as optical amplifiers, where low PMD is critical.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An optical isolator comprising:
a first stage configured to refract a light ray applied in a forward direction into a first ray and a second ray, the first stage having a first core including a first birefringent wedge with a first optic axis, and the first core also including a second birefringent wedge with a second optic axis that is different from the first optic axis; and
a second stage mechanically rotated about 90° with respect to said first stage and configured to refract said first and second rays in a substantially parallel manner, the second stage having a second core including a third birefringent wedge with a third optic axis that is rotated about 45° with respect to the optic axis of the first birefringent wedge, and the second core also including a fourth birefringent wedge with a fourth axis that is rotated about 45° with respect to the optic axis of the second birefringent wedge.

2. The optical isolator of claim 1, wherein said first ray is an e-ray with respect to said first stage and is an o-ray with respect to said second stage, and said second ray is an o-ray with respect to said first stage and is an e-ray with respect to said second stage.

3. The optical isolator of claim 2 further configured such that said e- and o-ray exit from said second stage having orthogonal polarizations and separated by a walk-off distance, thereby forming a plane.

4. The optical isolator of claim 3, wherein said first stage comprises a first Faraday rotator disposed between said first and second birefringent wedges having a polarization plane rotation of about 45°, wherein the first birefringent has a first wedge angle and the second birefringent wedge has a second wedge angle.

5. The optical isolator of claim 4, wherein said first and second wedge angles arc substantially equal in magnitude.

6. The optical isolator of claim 4, wherein said first Faraday rotator is configured to rotate the polarization of applied light by about 45°.

7. The optical isolator of claim 4, wherein said second stage comprises a second Faraday rotator disposed between said third and fourth birefringent wedges having polarization plane rotating angle of about 45°, wherein the third optic axis of the third birefringent wedge is about 90 degrees apart from the second optic axis of the second birefringent wedge and the fourth optic axis is about 45 degrees apart from the third optic axis.

8. The optical isolator of claim 7, wherein said second Faraday rotator is configured to rotate the polarization of applied light by about 45°.

9. The optical isolator of claim 8, wherein a rotation direction of said first and second Faraday rotators is at least one of a same and opposite direction.

10. An optical isolator comprising:
    first means for refracting a light ray applied in a forward direction into a first ray and a second ray, wherein the first means includes a first birefringent wedge and a second birefringent wedge, the first birefringent wedge having a first optic axis that is different from a second optic axis of the second birefringent wedge; and
    second means, mechanically rotated about 90° with respect to said first means, for refracting said first and second rays in a substantially parallel manner, wherein the second means includes a third birefringent wedge having a third optic axis that is rotated about 45° with respect to the first optic axis and a fourth birefringent wedge having a fourth optic axis that is rotated about 45° with respect to the second optic axis.

11. The optical isolator of claim 10, wherein said first ray is an e-ray with respect to said first means and is an o-ray with respect to said second means, and said second ray is the o-ray with respect to said rust means and is the e-ray with respect to said second means.

12. The optical isolator of claim 11, wherein said e- and o-rays exit from said second means having orthogonal polarizations and separated by a walk-off distance, thereby forming a plane.

13. The optical isolator of claim 12, wherein said first means comprises a first rotator means disposed between said first and second birefringent wedges for rotating a polarization plane of applied light by about 45°, the first birefringent wedge having a first angle and the second birefringent wedge having a second angle.

14. The optical isolator of claim 13, wherein said first and second angles are substantially equal in magnitude.

15. The optical isolator of claim 13, wherein said second means comprises a second rotator means disposed between said third and fourth birefringent wedges for rotating a polarization plane of applied light by about 45°, wherein the third birefringent wedge has a third angle and the fourth birefringent wedge has a fourth angle.

* * * * *